United States Patent
Zheng

(10) Patent No.: US 11,570,149 B2
(45) Date of Patent: *Jan. 31, 2023

(54) FEEDBACK MECHANISM TO ENFORCE A SECURITY POLICY

(71) Applicant: Palo Alto Networks, Inc., Santa Clara, CA (US)

(72) Inventor: Zhou Olivier Zheng, Singapore (SG)

(73) Assignee: Palo Alto Networks, Inc., Santa Clara, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/217,682

(22) Filed: Mar. 30, 2021

(65) Prior Publication Data
US 2022/0321533 A1    Oct. 6, 2022

(51) Int. Cl.
*H04L 9/40* (2022.01)
*H04L 61/251* (2022.01)
*H04L 61/5076* (2022.01)
*H04L 61/4511* (2022.01)

(52) U.S. Cl.
CPC ........ *H04L 63/0263* (2013.01); *H04L 61/251* (2013.01); *H04L 61/5076* (2022.05); *H04L 63/0236* (2013.01); *H04L 63/20* (2013.01); *H04L 61/4511* (2022.05)

(58) Field of Classification Search
CPC .............. H04L 63/0263; H04L 61/251; H04L 63/0236; H04L 63/20; H04L 61/5076; H04L 61/4511
See application file for complete search history.

(56) References Cited

U.S. PATENT DOCUMENTS

| | | |
|---|---|---|
| 5,950,195 A | 9/1999 | Stockwell |
| 8,122,493 B2 | 2/2012 | Drako et al. |
| 9,436,820 B1 * | 9/2016 | Gleichauf ............... H04L 63/02 |
| 10,924,456 B1 * | 2/2021 | Moore ................ H04L 63/0281 |
| 2003/0131245 A1 | 7/2003 | Linderman |
| 2003/0200463 A1 | 10/2003 | McCabe |
| 2004/0260922 A1 | 12/2004 | Goodman |
| 2006/0101113 A1 | 5/2006 | Lemson |
| 2007/0101437 A1 | 5/2007 | Yamamoto |
| 2007/0199044 A1 | 8/2007 | Hughes |
| 2007/0260649 A1 | 11/2007 | Chakra |
| 2008/0052758 A1 | 2/2008 | Byrnes |
| 2008/0159312 A1 | 7/2008 | Tuononen |
| 2008/0184357 A1 | 7/2008 | Drako |
| 2009/0007241 A1 | 1/2009 | Tewari |
| 2009/0031028 A1 | 1/2009 | Kumar |
| 2009/0037976 A1 | 2/2009 | Teo |
| 2010/0100957 A1 | 4/2010 | Graham |

(Continued)

*Primary Examiner* — Cheng-Feng Huang
(74) *Attorney, Agent, or Firm* — Van Pelt, Yi & James LLP

(57) ABSTRACT

Techniques for providing a feedback mechanism to enforce a security policy are provided. In some embodiments, dynamic resolution of Fully Qualified Domain Name (FQDN) address objects in policy definitions includes receiving a security policy that includes a domain name (e.g., the network policy can include a network security rule that is based on the domain name); and periodically updating Internet Protocol (IP) address information associated with the domain name based on a feedback mechanism that utilizes network logs (e.g., implemented using a learning process for FQDN to IP address mappings) to facilitate a more effective security policy enforcement.

20 Claims, 12 Drawing Sheets

(56) References Cited

U.S. PATENT DOCUMENTS

| | | |
|---|---|---|
| 2010/0138910 A1 | 6/2010 | Aldor |
| 2010/0274970 A1 | 10/2010 | Treuhaft |
| 2011/0072262 A1 | 3/2011 | Amir |
| 2011/0116382 A1 | 5/2011 | McCann |
| 2011/0126277 A1 | 5/2011 | McCann |
| 2011/0282997 A1 | 11/2011 | Prince |
| 2016/0014082 A1* | 1/2016 | Bharali .............. H04L 63/02 726/1 |
| 2018/0295148 A1* | 10/2018 | Mayorgo ............ H04L 63/20 |
| 2022/0278955 A1* | 9/2022 | Roy .............. H04L 61/4541 |

\* cited by examiner

FIG. 3A ( rule eq Microsoft ) and ( session_end_reason neq policy-deny ) and ( subtype eq end ) and ( session_end_reason eq tcp-fin )

| SOURCE DYNAMIC ADDRESS GROUP | DESTINATION | DESTINATION DYNAMIC ADDRESS GROUP | DYNAMIC USER GROUP | TO PORT | APPLICATION | ACTION | RULE | SESSION END REASON | BYTES | HTTP/A CONNE SESSI |
|---|---|---|---|---|---|---|---|---|---|---|
|  | 103.21.149.157 |  |  | 443 | ssl | allow | Microsoft | tcp-fin | 6.2k | 0 |
|  | 103.21.149.157 |  |  | 443 | ssl | allow | Microsoft | tcp-fin | 6.2k | 0 |

302

304

| Source | | | | Destination | | | APPLICATION | SERVICE | URL CATEGORY | ACTION | PROFILE | OPTIONS | HIT COUNT | LAST |
|---|---|---|---|---|---|---|---|---|---|---|---|---|---|---|
| DDRESS | USER | DEVICE | ZONE | ADDRESS | DEVICE | | | | | | | | | |
| ny | any | any | untrust | any | any | | ms-product-... ms-update ssl | ✖ application-... | Microsoft | ⊙ Allow | | | 13504764 | 2020 |

Normal Situation

Traffic Blocked

Not Allowed Download

Exfiltration

FEEDBACK MECHANISM TO ENFORCE A SECURITY POLICY

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 3A illustrates an example rule for a firewall configured to enforce a security policy based on layer 7 (L7) information that is enriched with layer 3 (L3) information in accordance with some embodiments.

DETAILED DESCRIPTION

Figure 1:
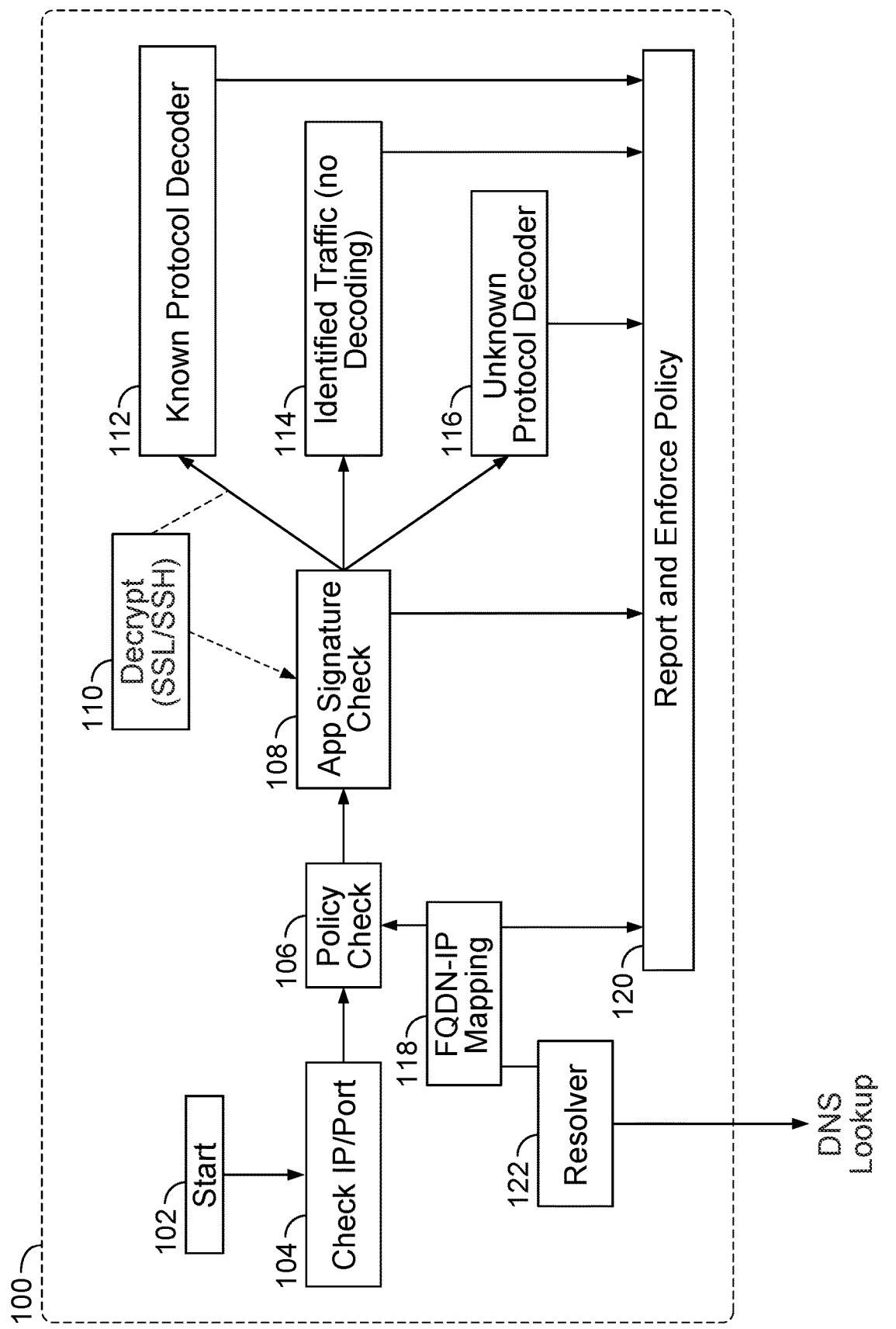
FIG. 1 is a functional diagram for providing a feedback mechanism to enforce a security policy in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets— using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Security Challenges for Network-Based Security Solutions

A network/security policy typically uses various combinations of source and destination addresses, subnets, and ports to apply the policy. However, there are many use cases in which, rather than using IP addresses, it is more convenient and logical for the policy (e.g., a network/security policy) to be defined by Fully Qualified Domain Names (FQDNs) (e.g., www.yahoo.com or www.google.com). In some cases, rather than using IP addresses, it is more convenient and logical for the network policy to be defined by such FQDNs or just their respective domains (e.g., www.yahoo.com or Yahoo.com; or www.google.com or Google.com), which can be resolved by a central and/or local DNS and applied to multiple devices. Specifically, each device can resolve these names to various IP addresses based on various network configurations and device deployments. For example, the Google domain can resolve to different IP addresses at various remote site offices (e.g., different geographies, such as San Francisco, Calif.; New York, N.Y.; London, United Kingdom; Beijing, China; Singapore, Singapore; and Tokyo, Japan) of a single enterprise.

However, the policy specified by an FQDN can be applied to a session only after the Layer 3 (L3) destination is associated with a Layer 7 (L7) destination. Because the L3 destination is typically associated with the L7 destination at a later point in the session, this creates a security hole/risk for malware to perform potentially malicious/undesired activities (e.g., data leakage or other malicious/undesired activities). As such, the application of the L7 specified policy allows for a potential security hole during those initial network communications (e.g., data leakage in the initial traffic, such as during the initial TCP 3-way handshake for a web browsing session, as such can bypass L7 network/security policy enforcement at the network device, prior to, for example, a TLS handshake stage or an HTTP GET request for www.exampledomain.com stage at which the L7 network/security policy can effectively be enforced). For example, malware can send a payload to a malware destination in an initial communication to an L3 destination before a security device (e.g., a firewall or another network/security device) can enforce the policy based on the L7 destination. As such, there generally is a gap between the L3/L4 session initialization and the enforcement of the network/security policy at layer 7 using the associated L7 destination (e.g., using the domain/FQDN, such as the Uniform Resource Locator (URL) or Uniform Resource Indicator (URI)) to allow or deny traffic associated with the session based on a match to the network/security policy (e.g., based on a matching domain/FQDN and/or URL category, etc.). These and other examples are discussed in greater detail below with respect to various embodiments.

As such, certain network/security policies include domain names/FQDNs, which are easier for network/security administrators (admins) to manage for configuring such network/security policies (e.g., rather than having to enter/maintain specific IP addresses/ranges for such domain names/FQDNs). However, such network policies generally only perform the Domain Name Server (DNS) lookup to resolve the domain names when the network policy or network policy rule that includes the domain name is configured (i.e., at configuration time) and do not dynamically update the associated IP address information. However, IP addresses associated with domain names are not necessarily static and, as a result, such non-static IP addresses can change frequently and/or various domains frequently add new IP addresses, remove old IP addresses, and/or potentially use various Content Distribution Networks (CDNs) for hosting content. Also, for network/security policies, frequently resolving domain names can be more secure. Thus, current approaches do not provide for dynamic resolution (e.g., and thus may not have current IP address information for the domain name) for effective network/security policy enforcement as will also be further discussed below.

What are needed are improved techniques for using network/security policies that are specified using Fully Qualified Domain Names (FQDNs), such as for network policy enforcement and/or security policy enforcement.

Overview of Techniques for Providing a Feedback Mechanism to Enforce a Security Policy Techniques for providing a feedback mechanism to enforce a security policy are provided. In some embodiments, dynamic resolution of Fully Qualified Domain Name (FQDN) address objects in policy definitions includes receiving a network policy that includes a domain name (e.g., the network policy can include a network security rule that is based on the domain name); and periodically updating Internet Protocol (IP) address information associated with the domain name based on a feedback mechanism that utilizes network logs (e.g., implemented using a learning process for FQDN to IP address mappings) that include Domain Name Server (DNS) queries to facilitate a more effective security policy enforcement. For example, a network/security device (e.g., a firewall or other network gateway) can perform a learning process for FQDN to IP address mappings that utilizes past successful sessions or trusted information sources (e.g., based on network logs from a firewall or other trusted network/security device) to be used as an authorized IP range, and then the security policy can be enriched with the layer 3 information (e.g., IP addresses) and matching the FQDN address objects (e.g., web addresses, such as Uniform Resource Locations). As such, the security device can then be configured to block all connection attempts at layer 3 (e.g., using IP addresses, which can be performed in the initial connection request, such as during the initial TCP 3-way handshake for a web browsing session), which improves network security by reducing the opportunity for attackers to, for example, initiate a web-based session to send/download malicious traffic or perform other potentially malicious/undesired activities to destinations/web sites by bypassing the network/security policy enforcement during the initial session setup.

Accordingly, techniques for providing a feedback mechanism to enforce a security policy are disclosed. In some embodiments, a feedback mechanism to enforce a security policy includes receiving a security policy that includes a domain name; and performing a learning mode process to periodically update Internet Protocol (IP) address information associated with the domain name using a network log to enrich the security policy.

In an example implementation, a network/security device (e.g., a firewall or other network/security gateway/element in an enterprise network) can perform a learning process for FQDN to IP address mappings that utilizes past successful sessions or trusted information sources based on network logs from the network device or other trusted network/security device/element to be used as an authorized IP range associated with a given FQDN address object in the policy. The security policy can be periodically enriched with the layer 3 information (e.g., IP addresses) and matching the FQDN address objects (e.g., web addresses, such as Uniform Resource Locations). Specifically, the learning process can be performed periodically (e.g., the learning mode processing can be configured to execute for a predefined period of time upon deployment, such as being manually disabled or automatically disabled after a predetermined period of time such as one day or one week, and periodically updated and/or updated in response to configuration changes in the policy, such as when a new domain/FQDN is added to the policy, etc.) to enrich the policy from the past sessions that are logged in a network log to facilitate enhanced network/security policy enforcement using the updated L3 information associated with the FQDN address objects. For example, the traffic log information (e.g., matching the network/security policy, such as with the action allow and the end session reason is not an abnormal value) can be used to set the L3 destination information matching the associated L7 destination such that the L3 destination is automatically attached to the policy for each such L7 destination specified in the policy (e.g., depending on the IP address range (e.g., RFC 1918 or public IP address range), and to simplify the inputs, the IP can be automatically set as a/32 (private) or a subnet can be set for the public IP address range (e.g., a CDN scope instead of having n number of IP addresses)). As will be further described below, the disclosed learning mode processing provides an effective and efficient feedback mechanism for network/security policy enforcement to automatically update the IP address information associated with the specified L7 information that thereby reduces and/or eliminates the above-described security holes if network/security policy enforcement cannot be enforced at layer 3 during an initial session setup.

For example, using this approach that supports the use of specifying network policies based on FQDN address objects can also improve the workflow for security policy management. This approach can also improve effectiveness of policy enforcement by dynamically resolving the domain names and periodically updating the resolved IP addresses to maintain freshness of the resolved IP addresses. This approach can also improve monitoring of events by providing context sensitive resolution of IP addresses to names (e.g., domain names and/or host/server names). Also, using the various techniques described herein, the resolution of the FQDN address objects need not only be performed at configuration time, but can also be performed dynamically (e.g., periodically or based upon a predefined update schedule to execute the learning mode processing as further described herein) and updated as necessary for policy enforcement. The techniques described herein can also support both Internet Protocol version 4 (IPv4) addresses and Internet Protocol version 6 (IPv6) addresses.

In some embodiments, the system includes a security appliance (e.g., the security appliance can include a firewall) . In some embodiments, the IP address information includes Internet Protocol Version 4 (IPv4) information or Internet Protocol Version 6 (IPv6) information, and the domain name includes a Fully Qualified Domain Name (FQDN).

In some embodiments, the IP address information is periodically updated based on a Time To Live (TTL) value. In some embodiments, the IP address information is periodically updated based on a system frequency. In some embodiments, the IP address information is periodically updated based on a configuration setting. In some embodiments, the IP address information is periodically updated based on an event.

In some embodiments, the domain name only includes a subset of a Fully Qualified Domain Name (FQDN) (e.g., yahoo or yahoo.com, google or google.com, or Facebook or facebook.com), and the policy includes a host name that is not specified as an FQDN (e.g., Mail Server).

In some embodiments, dynamic resolution of FQDN address objects in policy definitions further includes enforcing the network policy based on the IP address, in which the IP address is associated with the domain name, and the policy includes a rule or action based on the domain name. In some embodiments, dynamic resolution of FQDN address objects in policy definitions further includes monitoring events based on a context sensitive resolution of the domain name.

In some embodiments, dynamic resolution of FQDN address objects in policy definitions further includes storing the domain name, the IP address information associated with the domain name, and a Time To Live (TTL) value for the IP address information associated with the domain name (e.g., in a data store including one or more tables).

In some embodiments, dynamic resolution of FQDN address objects in policy definitions further includes periodically attempting to resolve the domain name, in which the domain name is unresolved; and disabling or blocking network traffic associated with the unresolved domain name while the domain name remains unresolved.

In some embodiments, dynamic resolution of FQDN address objects in policy definitions further includes reporting events based on network security threats, in which the reported events include one or more domain names associated with at least one of the network security threats.

In some embodiments, dynamic resolution of FQDN address objects in policy definitions further includes periodically updating the IP address information associated with the first domain based on a Time To Live (TTL) value, system frequency, a configuration setting, or an event; and periodically updating the IP address information associated with the second domain based on a Time To Live (TTL) value, system frequency, a configuration setting, or an event.

These and other techniques for providing a feedback mechanism to enforce a security policy are further disclosed below with respect to various embodiments.

Example System Embodiments for Providing a Feedback Mechanism to Enforce a Security Policy FIG. 1 is a functional diagram for providing a feedback mechanism to enforce a security policy in accordance with some embodiments. As shown in FIG. 1, network traffic is monitored at a firewall 100. In some embodiments, network traffic is monitored using a data appliance (e.g., a data appliance that includes security functions, such as a security appliance that includes a firewall). In some embodiments, network traffic is monitored using a gateway (e.g., a gateway that includes security functions, such as a security gateway). In some embodiments, network traffic is monitored using a host (e.g., security software executed on a host device, such as a network server or client computing device, such as a personal computer, laptop, tablet, or smart phone). In some embodiments, the network traffic is monitored using pass through (e.g., in line) monitoring techniques. In some embodiments, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In some embodiments, network traffic is monitored using a state-based firewall. In some embodiments, the state-based firewall can monitor traffic flows using an APP-ID engine (e.g., App Signature Check & User ID Check 108). For example, the monitored network traffic can include HTTP traffic, FTP traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP ID engine using various application signatures for identifying applications based on packet flow analysis). For example, APP-ID engine 108 can be configured to determine what type of traffic the session involves, such as HTTP traffic, FTP traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using SSL, SSH, or another known encryption protocol), then the monitored traffic can be decrypted using a decrypt engine 110 (e.g., applying man in the middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies, including network/security policies based on destination domains/FQDNs and/or URL categories). For example, firewall policies can be applied to the monitored network traffic using application identification, user identification, and/or other information to match signatures (e.g., file-based, protocol-based, based on destination domain/FQDN/URL categories, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, policies are specified using FQDN address objects (e.g., domain names, such as www.google.com or www.yahoo.com, and/or host/server names, such as MailServer), which are enriched with IP addresses using the disclosed learning mode processing techniques (e.g., at initial deployment time and can also be updated/refreshed periodically and/or based on various events, such as configuration changes) to associate FQDN address objects with IP address(es) using various techniques as described herein with respect to various embodiments. Thus, policies can be specified using FQDN address objects and enforced using IP addresses along with (optionally) other criteria, such as port, protocol, and/or other criteria/information.

For example, a policy definition can be specified for security policy enforcement (e.g., firewall, vulnerability protection, anti-malware protection, intrusion prevention, and/or other types of security). A policy can also be specified for networking policy enforcement (e.g., policy-based forwarding or routing, Quality of Service (QoS), and/or other types of networking policies). In some embodiments, a policy is a collection of rules (e.g., ordered rules). For example, a rule can be specified for ingress/inbound and/or egress/outbound parameters, such as IP address/range/subnet, port, protocol, and/or other characteristics of a network traffic flow. In addition to IP address, the rule can be specified by FQDN address object(s) of the source and/or destination entities. The actual IP addresses that will match the rule for policy enforcement can be independent of policy configuration. As another example, the firewall 100 can also monitor and log (e.g., cache/store such network logs in an FQDN-IP mapping log) the DNS requests and the DNS responses from a client attempting to resolve names, such as shown at FQDN-IP mapping 118. The firewall can update a network log accordingly (e.g., update FQDN-IP mapping 118) based on the monitored DNS responses, if the DNS responses are relevant for FQDN resolution of objects used in a policy (e.g., if the policy uses www.yahoo.com and a client browser accessed the www.yahoo.com web page, then the firewall can cache the DNS response from the DNS server for the DNS request from the browser).

As also shown in FIG. 1, a resolver 122 is provided to perform dynamic FQDN address objects resolution to IP addresses using various techniques described herein with respect to various embodiments. For example, resolver 122 can send a DNS query to a primary domain name server for a DNS lookup. As another example, one or more servers can be specified for DNS query information requests, in which the servers are used for name resolution if no specific context-based server is configured as further described herein with respect to various embodiments. Resolver 122 sends the resolved IP address information to FQDN-IP mapping 118, which can store (e.g., cache or store based on storage limitations and/or other parameters or configuration settings) the FQDN address object and associated IP address (es), along with other information, such as TTL parameters/values or configured time-out parameters/values. The FQDN-IP mapping 118 is shown in communication with policy check 106 and report and enforce policy 120 (e.g., a policy enforcement engine), which can use this information for policy enforcement based on IP address information, in which the policy is specified by FQDN address objects.

In some embodiments, the traffic flow monitored by an active data appliance can generate events that are monitored and used for further analysis. For example, the events can be stored in memory and can also be stored in persistent storage if required. The traffic flow can include both the source and destination IP addresses. In some cases, it is also useful and convenient to report the resolved names for those IP addresses. The events generated by the devices can be forwarded to a central repository for storage and aggregation of network log data that can be provided for the learning mode processing to enrich domain/FQDN-based network/security policy information as similarly described herein.

In some embodiments, various other functional architectures and flows are provided to implement the policy enforcement using host information profile techniques described herein. For example, some of these functions can be implemented in software executed on a general processor and/or some of these functions can be implemented using hardware acceleration techniques for faster packet processing of network traffic.

Figure 2:
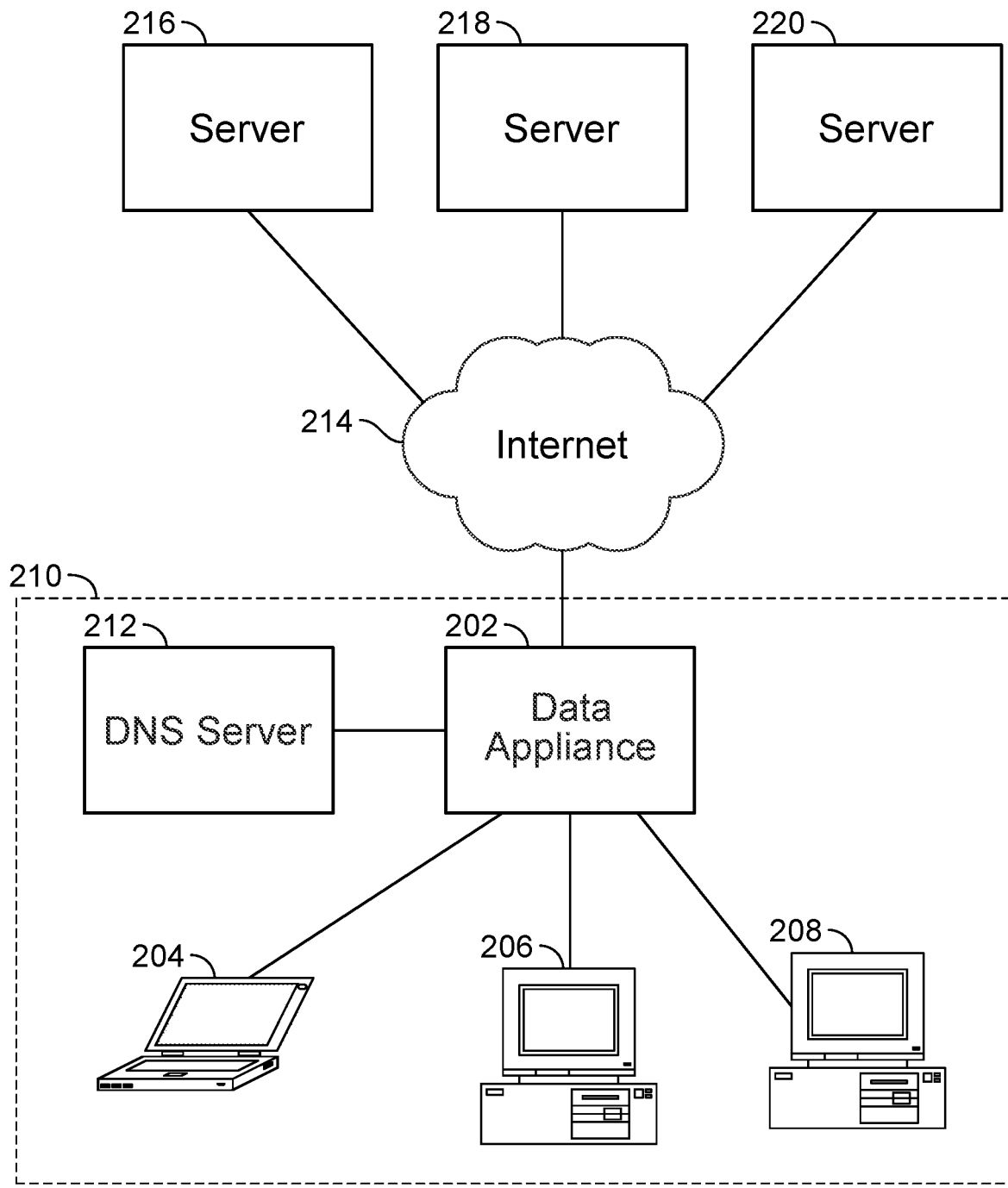
FIG. 2 is a block diagram for providing a feedback mechanism to enforce a security policy in accordance with some embodiments.

FIG. 2 is a block diagram for providing a feedback mechanism to enforce a security policy in accordance with some embodiments. As shown, a data appliance 202 is at the perimeter of a protected network 210, which includes clients 204, 206, and 208. Data appliance 202 can include a firewall function, such as firewall function 100 as described above, to protect the network and clients within the protected network 210, which is in communication with the Internet 214 and various servers, such as servers 216, 218, and 220 (e.g., web servers, mail servers, file servers, and/or other types of servers).

In some embodiments, data appliance 202 performs a dynamic resolution of FQDN address objects in policy definitions (e.g., at enforcement time or periodically updating to maintain a current/fresh IP address resolution for such domain names) using various techniques as described herein with respect to various embodiments. For example, data appliance 202 can send a DNS query to a primary DNS server 212 for a DNS lookup. In some embodiments, the data appliance 202 performs the disclosed learning mode processing to update the policy to enrich the FQDN address objects with IP addresses as further described herein. Thus, policies can be specified using domain names and/or host/server names and enforced using IP addresses at layer 3 along with other criteria, such as port, protocol, and/or other criteria/information.

Figure 3B:
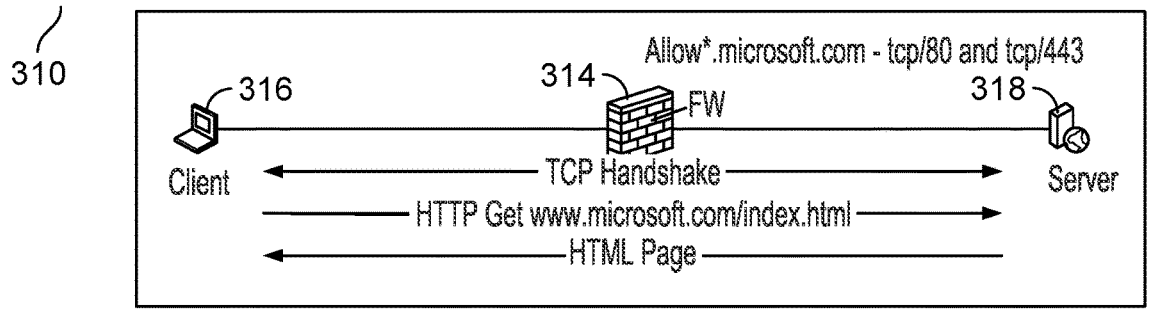
FIG. 3B is example network diagrams illustrating a firewall configured to enforce a security policy based on layer 7 (L7) information.
Figure 3B:
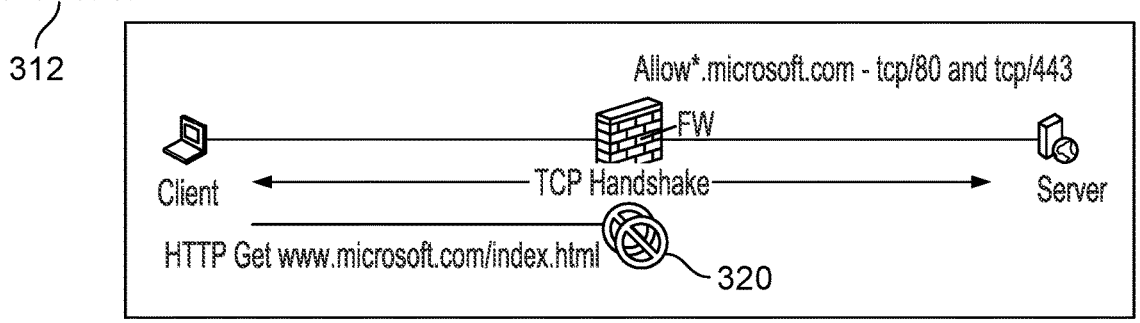

FIG. 3A illustrates an example rule for a firewall configured to enforce a security policy based on layer 7 (L7) information that is enriched with layer 3 (L3) information in accordance with some embodiments. Referring to FIG. 3A, a destination IP address as shown at 302 matches a URL category of a security policy rule as shown at 304. The feedback mechanism (e.g., learning mode processor component, such as shown at 628 of FIG. 6 and further described below) can be configured to update the policy to effectively enrich the policy with L3 information. Specifically, the learning process can be performed for a predetermined period of time (e.g., the learning mode processing can be configured to execute for a predefined period of time upon deployment, such as being manually disabled or automatically disabled after a predetermined period of time such as one day or one week, and the learning mode processing can also be periodically updated and/or updated in response to configuration changes in the policy, such as when a new domain/FQDN is added to the policy, etc.) to enrich the policy from the past sessions that are logged in a network log to facilitate enhanced network/security policy enforcement using the updated L3 information associated with the FQDN address objects. For example, the traffic log information (e.g., matching the network/security policy, such as with the action allow and the end session reason is not an abnormal value) can be used to set the L3 destination information matching the associated L7 destination such that the L3 destination is automatically attached to the policy for each such L7 destination specified in the policy (e.g., depending on the IP address range (e.g., RFC 1918 or public IP address range), and to simplify the inputs, the IP can be automatically set as a/32 (private) or a subnet can be set for the public IP address range (e.g., a CDN scope instead of having n number of IP addresses)). As will be further described below, the disclosed learning mode processing provides an effective and efficient feedback mechanism for network/security policy enforcement to automatically update the IP address information associated with the specified L7 information that thereby reduces and/or eliminates the above-described security holes if network/security policy enforcement cannot be enforced at layer 3 during an initial session setup and as will now be further described below with respect to FIGS. 3B and 3C.

FIG. 3B is example network diagrams illustrating the security risks associated with a firewall configured to enforce a security policy based on layer 7 (L7) information.

Referring to FIG. 3B, as shown at 310 and 312, the behavior of having the security policy rule enforced by a firewall 314 to allow traffic only on a specific URL is illustrated by these example network diagrams. In both of these use case scenarios, the 3-way TCP handshake completes before policy enforcement can be performed by firewall 314 as there is no URL information in the L3 and L4 headers of these initial communications passing through firewall 314 from client 316 and server 318. Then, on the L7 information, firewall 314 can determine the URL to match the rule in the policy, which can be determined using the TLS handshake with the SNI or it can be determined using the GET query. As shown, after the TCP handshake, the L7 rule can typically be enforced by the firewall using the FQDN/URL category-based policy, such as shown at 320, which with a request to access www.facebook.com/index.html can be blocked by the policy to only allow access to *.microsoft.com using the firewall.

However, as similarly discussed above, this gives rise to various security holes if the firewall is performing such enforcement only based on L7 information. Examples of two different types of potential security attacks will now be described.

Figure 3C:
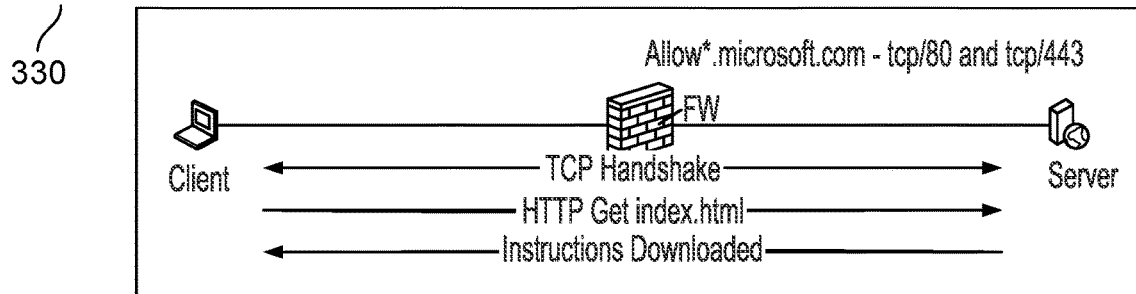
FIG. 3C is example network diagrams illustrating the security risks associated with a firewall configured to enforce a security policy based on layer 7 (L7) information.
Figure 3C:
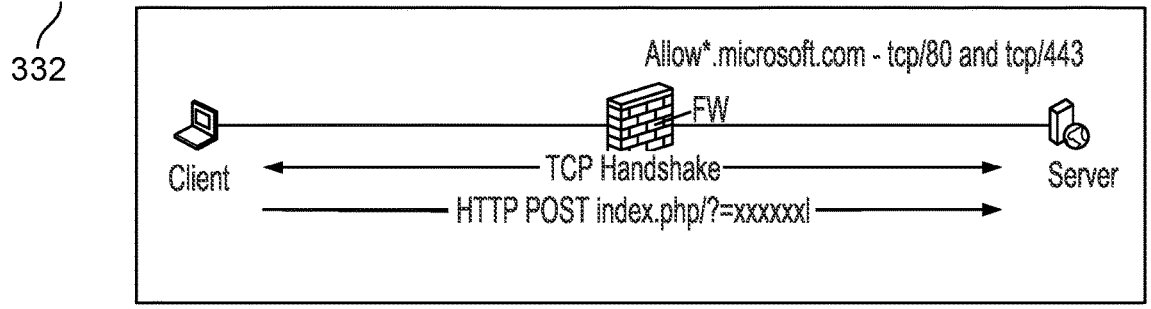

FIG. 3C is example network diagrams illustrating the security risks associated with a firewall configured to enforce a security policy based on layer 7 (L7) information.

Referring to FIG. 3C, as shown at 330, in the example first attack, an attacker can effectively bypass L7 policy enforcement by the firewall to perform the download of a malicious payload. In this example first attack, the bad actor using the client can perform a simple GET index.html on an IP address (e.g., a destination IP address for a malware server). In this example, the firewall does not block the traffic (e.g., as the firewall does not yet have access to L7 information associated with the server), and the bad actor can successfully download from the malware payload (e.g., instructions for next moves). For example, the malware executing on the client can telnet to the malware destination IP address and then send a GET index.html request (e.g., to get the index page content) as shown.

Referring to FIG. 3C, as shown at 332, in the example second attack, an attacker can effectively bypass L7 policy enforcement by the firewall to perform data exfiltration from the enterprise network. In this example second attack, the bad actor from the client can perform send POST queries to the index.php (i.e., a root page of the web server) as shown. In this example second attack, the firewall will not block the traffic based on L7 policy enforcement (e.g., as the firewall does not yet have access to L7 information associated with the server), and the bad actor can effectively exfiltrate data from the enterprise network. For example, the malware executing on the client can telnet to the malware destination IP address and then send a POST index.php/?data=xxxxx request (e.g., and the malware server can simply be configured to listen and dump POST queries) as shown.

Figure 3D:
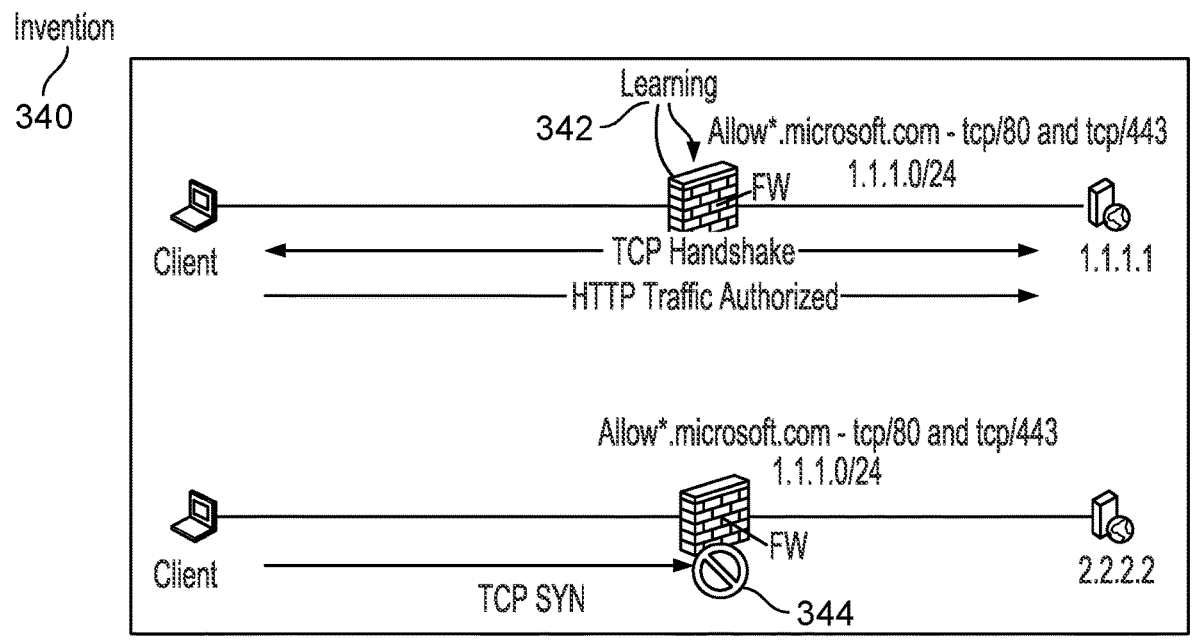
FIG. 3D is example network diagrams illustrating the security enhancements facilitated by providing a feedback mechanism to enforce a security policy in accordance with some embodiments.

FIG. 3D is example network diagrams illustrating the security enhancements facilitated by providing a feedback mechanism to enforce a security policy in accordance with some embodiments. Referring to FIG. 3D, as shown at 340, the firewall executes a learning mode processing component as shown at 342 to use the past successful sessions or trusted information sources to be used as the authorized IP range, such as will be further described below with respect to FIGS. 3E-G. As such, the learning mode processing can effectively and efficiently enrich the firewall's security policy with the associated L3 information (e.g., IP addresses/IP address ranges) matching the URLs specified in the security policy. As a result, the firewall can, for example, block all connection attempts at layer 3 processing of the network traffic, which denies the opportunity of attackers to set a session to send/download traffic in contrast to the typical layer 7 processing of the network traffic as discussed above with respect to FIGS. 3A and 3B. Specifically, the security policy can be enforced during the initial 3-way TCP handshake based on the IP address as shown at 344.

Figure 3E:
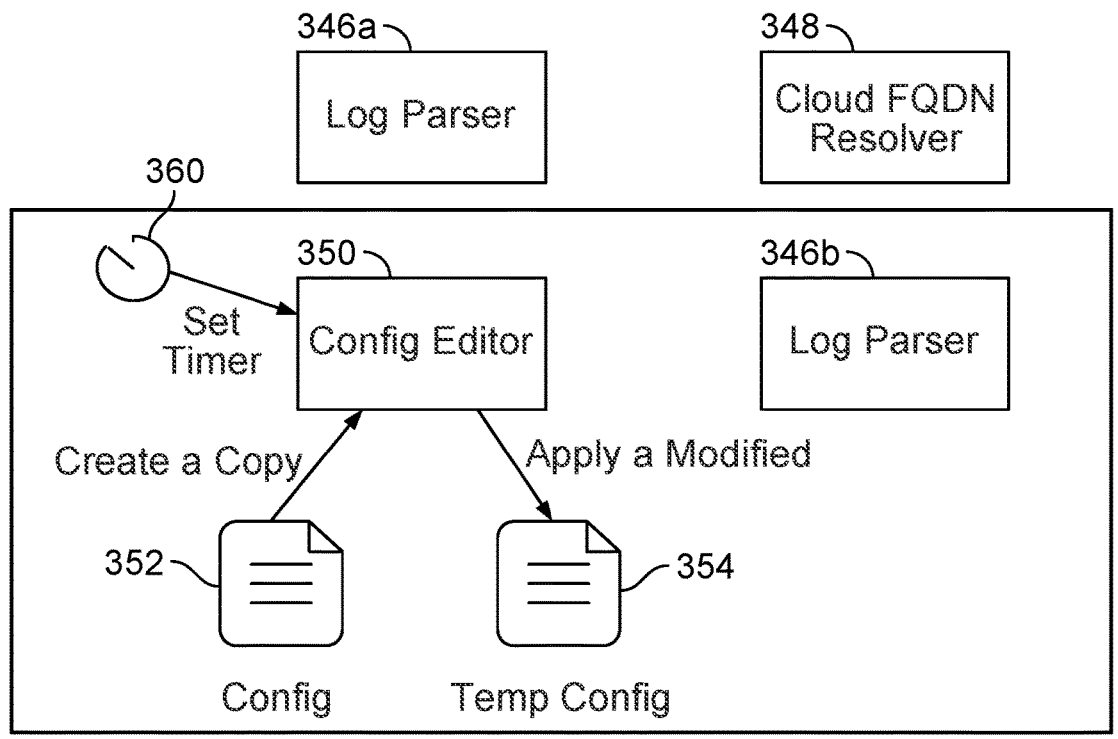
FIGS. 3E-G are component diagrams for providing a feedback mechanism to enforce a security policy using a learning mode in accordance with some embodiments.
Figure 3F:
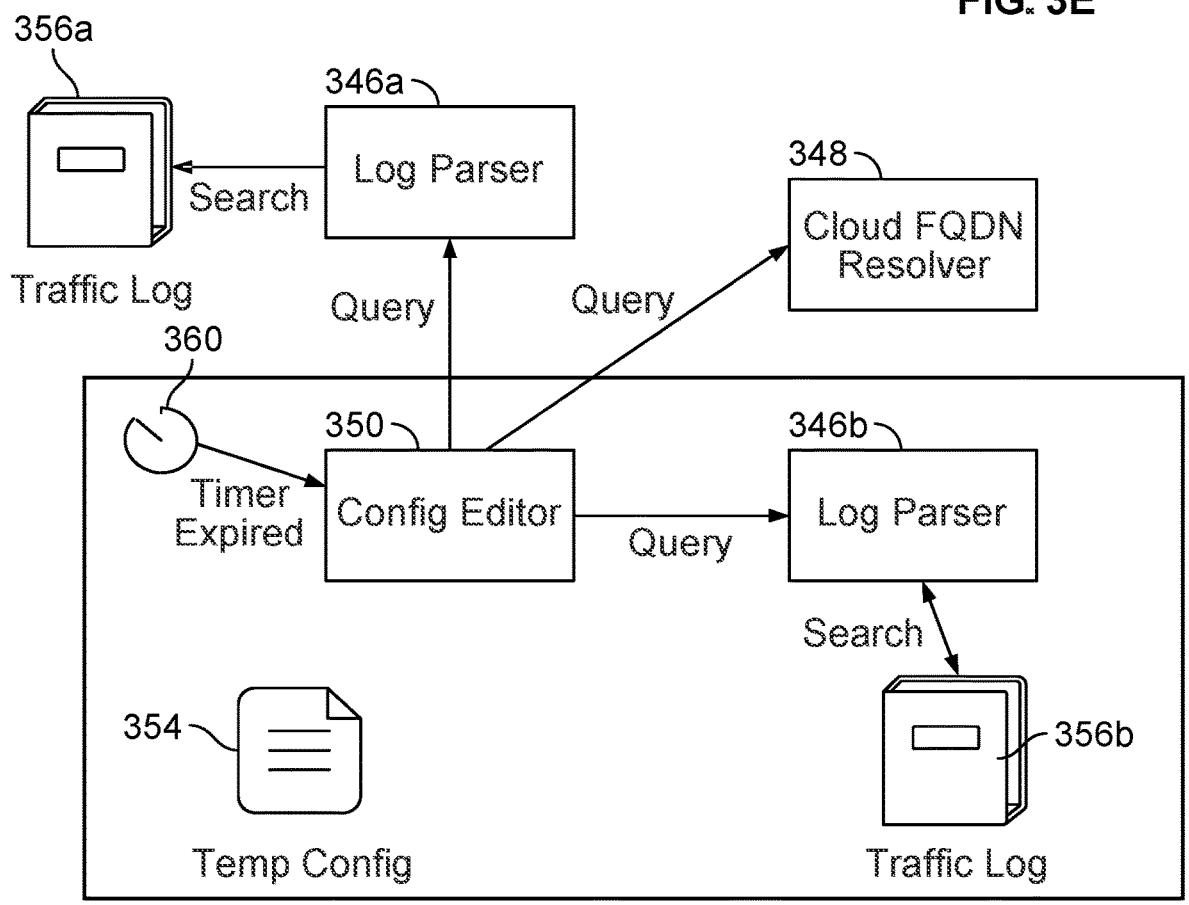
Figure 3G:
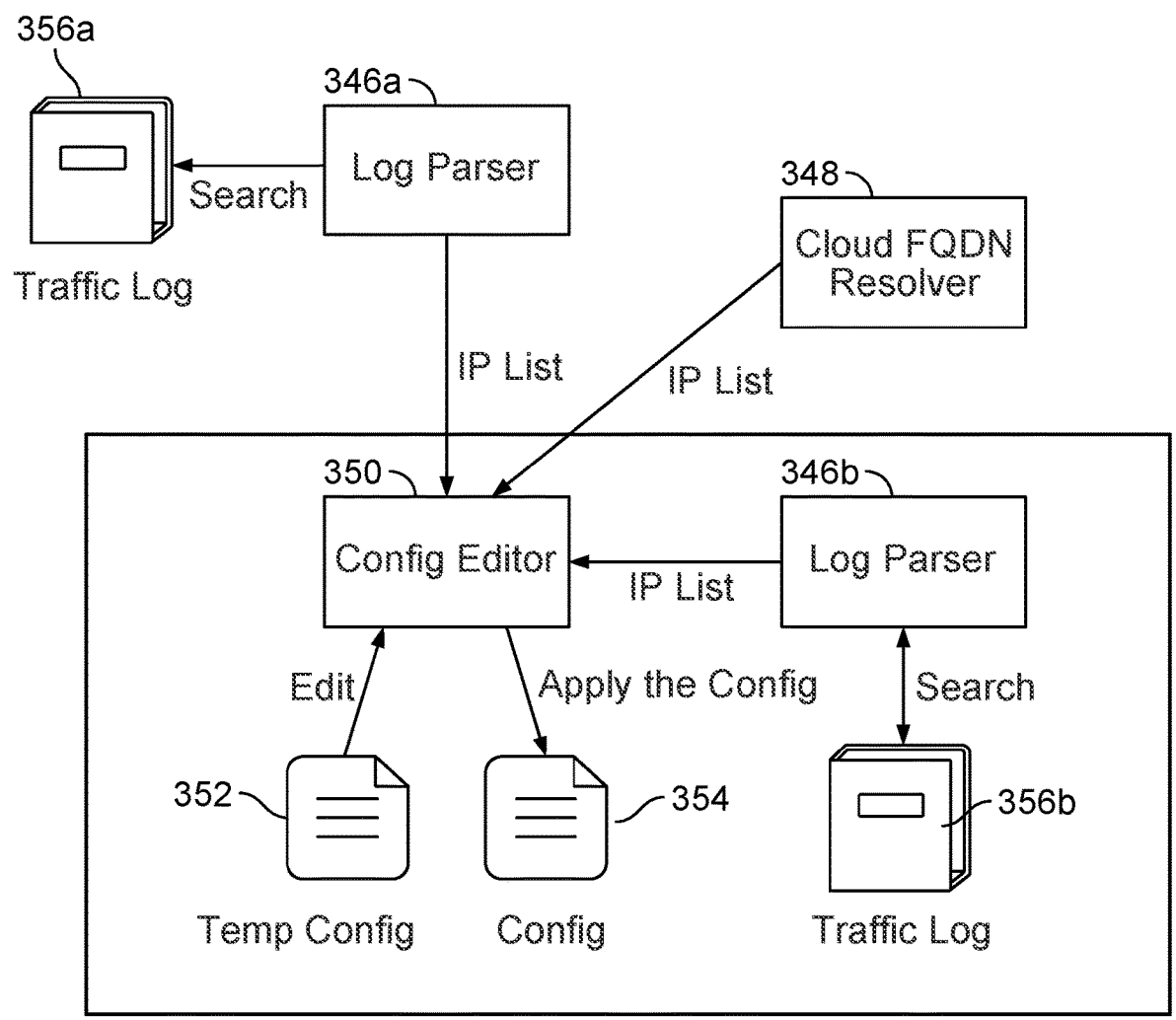

FIGS. 3E-G are component diagrams for providing a feedback mechanism to enforce a security policy using a learning mode in accordance with some embodiments. Referring to FIG. 3E, an activation phase for implementing the disclosed feedback mechanism to enforce a security policy can be performed by enabling a learning mode setting (e.g., which can include various learning mode settings, such as which local/external sources should be utilized to enrich the FQDN-based security policy with relevant IP information as well as how long and/or frequently to perform the learning mode to enrich/update the FQDN-based security policy). Once the learning mode is enabled, a program shown as a Configuration Editor processor component 350 is launched and query certain sources based on the learning mode settings. For example, the source information can be provided using a Cloud FQDN resolver 348. The source information can also or can alternatively be provided using a log repository shown as a traffic log 356a (e.g., an external traffic log) and/or a traffic log 356b (e.g., a local traffic log), which can be provided using another program shown as a Log Parser processor component 346a (e.g., external) or a Log Parser processor component 346b (e.g., local/embedded). When the learning phase is activated/triggered, a temporary configuration shown as temp config 354 is created for the learning phase via a service account. This temporary configuration provides a copy of the normal configuration shown at 352 with a learning rule. The learning rule is a copy of the rule to update, for example, any FQDNs with no or incomplete layer 3 (L3) information (e.g., this rule is a copy applied before the original rule). This temporary configuration is applied to the firewall during the learning phase for a period of time based on a configured timer 360.

Referring to FIG. 3F, after a timer 360 expires (e.g., the timer can be set to a predetermined period of time for performing an effective learning phase, such as 1 hour, 1 day, or 1 week, etc.), Config Editor processor 350 queries the different sources (e.g., information sources for IP addresses associated with FQDNs) specified in the learning settings. If the learning mode settings are configured to utilize the FQDN resolvers as a source, Config Editor processor 350 requests the URL list to be resolved and the prefix (e.g., number of bits set to 1 in the subnet mask) for the IP scope (e.g., network IP address). If the learning mode settings are configured to utilize the traffic logs as a source, Config Editor processor 350 sends a query for the learning rule name, the rule type (e.g., allow or deny), and the prefix for the IP scope. The log parser processor 346a-b parses the logs matching the rule name, the IP addresses and for the end session reason based on the type of rule. In both situations, the IP prefix is only used for public addressing (e.g., see IANA Addresses registry) in this example implementation.

Referring to FIG. 3G, each information source is provided to Config Editor processor 350 within a grace period with the list of IP scope (e.g., IP information, which includes IP address ranges associated with FQDNs). After sanitation (e.g., verify that the IP information is within legitimate address ranges) and removing potential duplicates (e.g., includes all entries in a data structure with no duplicate value—i.e., hash table), Config Editor processor 350 updates the learning rule L3 information with the information retrieved in config 354. Based on the learning setting, the learning rule can override the previous rule or merge the IP information with the previous rule (e.g., to enrich the FQDN-based rule with the learned relevant IP information for each FQDN). Once the rule is enriched/updated, the updated configuration is applied to the firewall for enforcing the enriched FQDN-based security policy.

Figure 4:
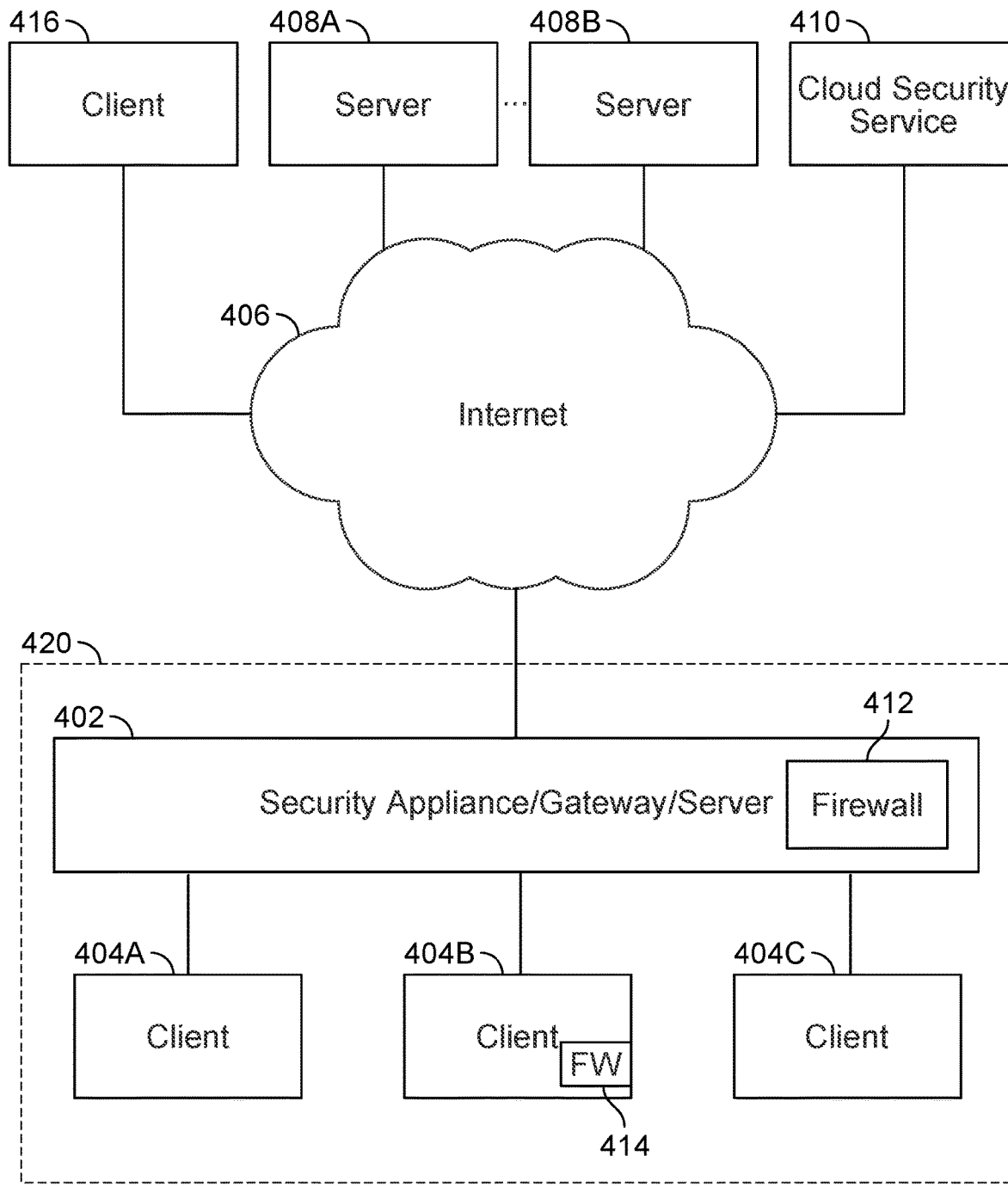
FIG. 4 is a block diagram illustrating an architecture for providing a feedback mechanism to enforce a security policy in accordance with some embodiments.

FIG. 4 is a block diagram illustrating an architecture for providing a feedback mechanism to enforce a security policy in accordance with some embodiments. As shown in FIG. 4, an enterprise network 420 includes client devices 404A, 404B, and 404C that are in communication with the Internet 406 via a security device 402. In some embodiments, the security device 402 includes a firewall 412 as shown. In some embodiments, one or more of the client devices 404A-C includes a firewall 414 (e.g., host based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIG. 1. For example, client devices 404A-C can include various computing devices that can access the Internet via wired and/or wireless communications, such as computers, laptops, tablets, smart phones, and/or various other types of computing devices with network communication capabilities. As also shown, client 416 and servers 408A-B are in communication with the Internet 406. For example, a client device (e.g., client devices 404A-C) can access a service provided by a server (e.g., servers 408A-B) via the Internet, such as a web related service (e.g., web site, cloud-based services, streaming services, or email service), peer-to-peer related service (e.g., file sharing), IRC service (e.g., chat service), and/or any other service that can be delivered via the Internet.

In some embodiments, dynamic resolution of FQDN address objects in policy definitions is implemented on or integrated into the security appliance/gateway/server 402 and/or firewall 412 or 414. In some embodiments, dynamic resolution of FQDN address objects in policy definitions is implemented on or integrated into and/or assisted by the security cloud service 410. For example, the security device 402 (e.g., an integrated security appliance/gateway/server) can communicate with security cloud service 410 (e.g., using secure communications, such as encrypted communication techniques) to receive security related content updates (e.g., signatures, heuristics, application ID related information, user ID related information, content ID related information, trusted/untrusted zone information, and/or policies/rules). As another example, the security device 402 (e.g., an integrated security appliance/gateway/server) can communicate with security cloud service 410 (e.g., using secure communications, such as encrypted communication techniques) to receive dynamic resolution/updates of FQDN address objects in policy definitions (e.g., for system wide IP address information, such as for remote web sites) including using the disclosed learning mode processing techniques. As will now be apparent, some or all of the functions described above with respect to FIG. 1 can be assisted by or implemented in whole or in part by the security cloud service 410. The security cloud service 410 can, for example, reduce the processing on the client device (e.g., 404B) and/or security device 402.

Figure 5:
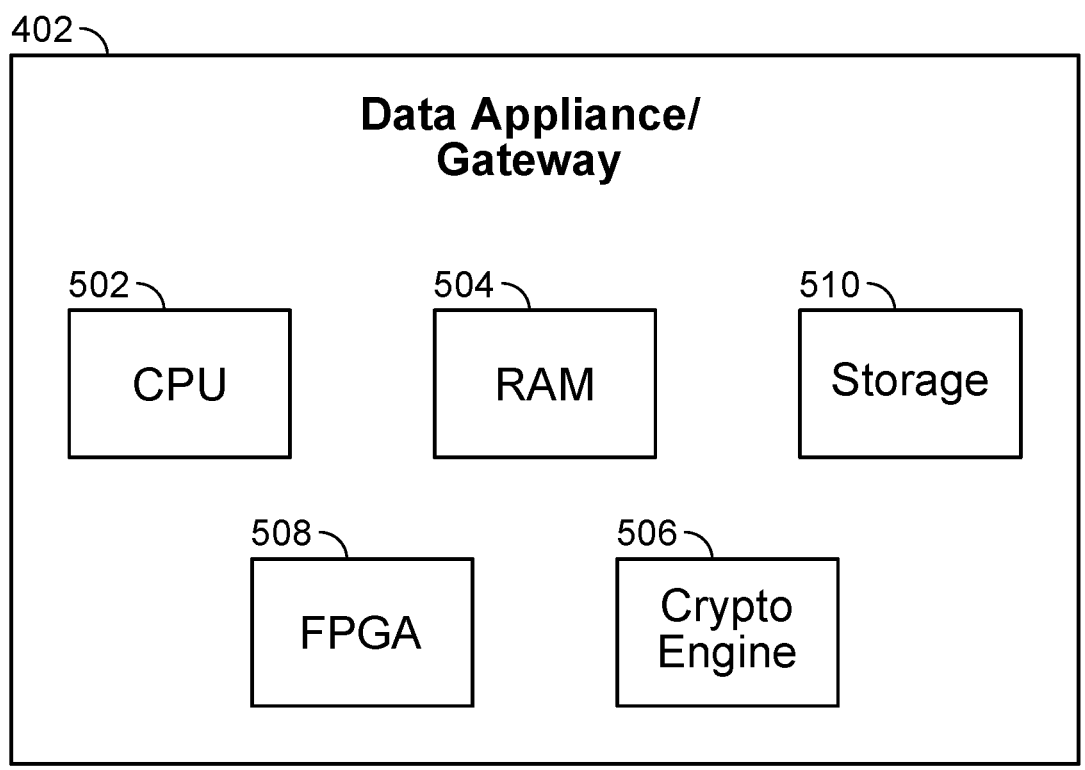
FIG. 5 is a functional diagram of hardware components of a data appliance for providing a feedback mechanism to enforce a security policy in accordance with some embodiments.

FIG. 5 is a functional diagram of hardware components of a data appliance for providing a feedback mechanism to enforce a security policy in accordance with some embodiments. The example shown is a representation of physical components that can be included in data appliance 402 (e.g., a data appliance or gateway). Specifically, data appliance 402 includes a high performance multi-core CPU 502 and RAM 504. Data appliance 402 also includes a storage 510

(e.g., one or more hard disks or solid state storage units), which is used to store policy and other configuration information as well as signatures. In some embodiments, storage 510 stores tables that include FQDN address objects and associated IP addresses and TTL parameters/values and possibly other information. In some cases, a domain or host/server name can have multiple associated IP addresses. Data appliance 402 can also include one or more optional hardware accelerators. For example, data appliance 402 can include a cryptographic engine 506 configured to perform encryption and decryption operations, and one or more FPGAs 508 configured to perform signature matching, act as network processors, and/or perform other tasks.

Figure 6:
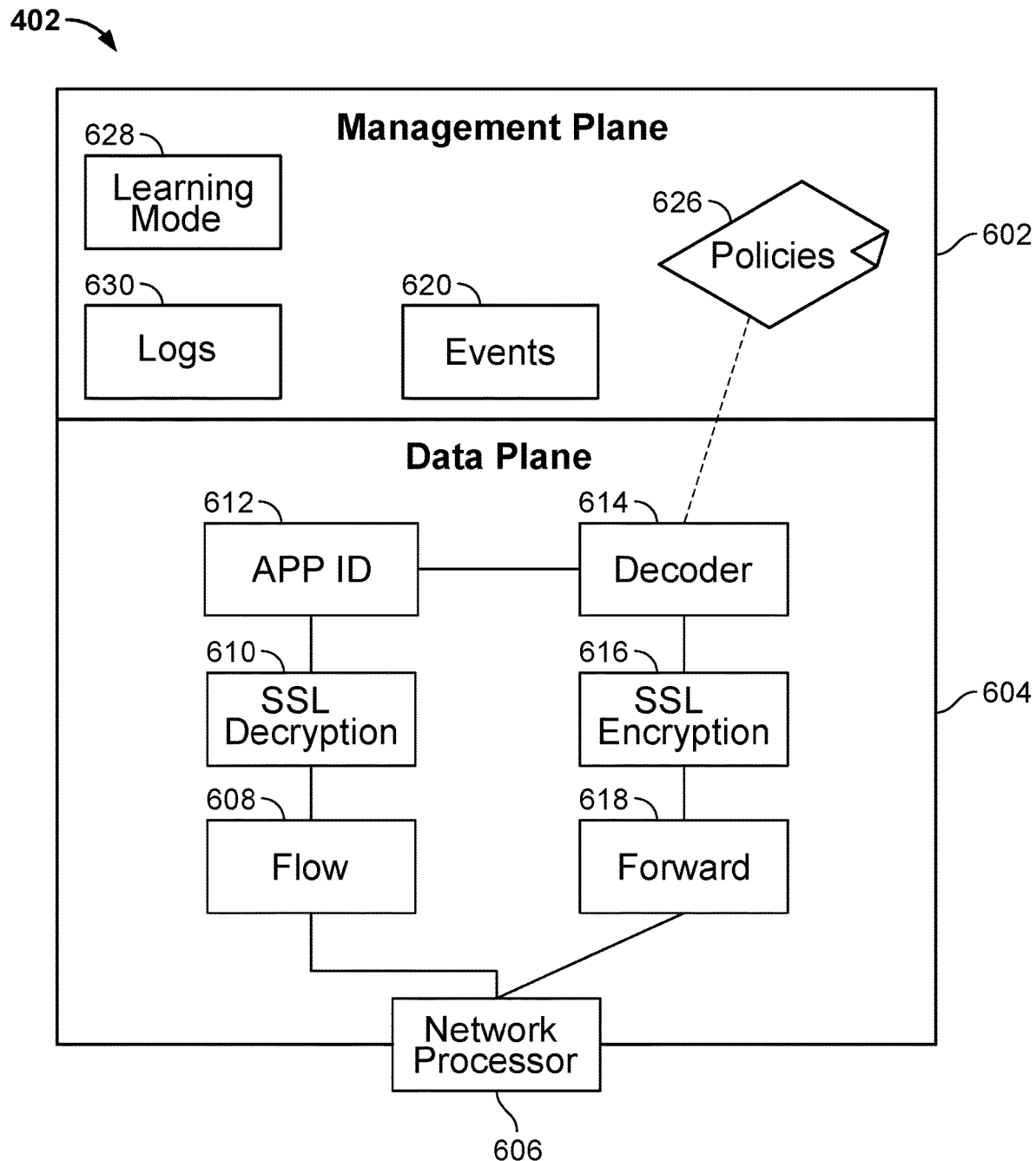
FIG. 6 is a functional diagram of logical components of a data appliance for providing a feedback mechanism to enforce a security policy in accordance with some embodiments.

FIG. 6 is a functional diagram of logical components for providing a feedback mechanism to enforce a security policy in accordance with some embodiments. The example shown is a representation of logical components that can be included in data appliance 402. As shown, data appliance 402 includes a management plane 602 and a data plane 604. In some embodiments, the management plane is responsible for managing user interactions, such as by providing a user interface for configuring policies and viewing log data (e.g., including network logs, such as cached/stored in logs 630). The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decrypter 610. Otherwise, processing by SSL decrypter 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/ engine. Based on the determination made by application identification module 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. If the decoded packets had been previously SSL decrypted at 610, then after decoding at 614 the packets are SSL encrypted using SSL Encryption module 616 and forwarded to their intended destination using Forward module 618. As also shown, policies 626 (e.g., network/security policies based on FQDNs) are received and stored in the management plane 602. In some embodiments, policy enforcement (e.g., policies can include one or more rules, which can be specified using domain and/or host/server names, and rules can apply one or more signatures or other matching criteria or heuristics) using signatures is applied as described herein with respect to various embodiments based on the monitored, identified, and decoded session traffic flows.

As also shown, a learning mode processing component 628 is provided in the management plane 602 of the data appliance 402. In some embodiments, learning mode processing component 628 performs the above-described learning mode techniques to periodically enrich FQDN address objects (e.g., domain names, such as www.yahoo.com or www.google.com or any other domain name) with IP address information associated with the FQDN address objects (e.g., using network log data cached/stored in network logs 630), in some cases, along with other information, such as TTL values/parameters, in the management plane 602. In some embodiments, learning mode processing component 628 performs the above-described learning mode techniques for FQDN address objects (e.g., domain and/or host/server names) specified in policies for an initial predetermined period of time upon deployment of the firewall and FQDN-based policy as described herein with respect to various embodiments. In some embodiments, learning mode processing component 628 also performs the above-described learning mode techniques for FQDN address objects for FQDN address objects (e.g., domain and/or host/server names) specified in policies at various other times based on configuration, system, events, TTL parameters/values, and/ or other triggers/criteria, as described herein with respect to various embodiments. In some embodiments, policy enforcement (e.g., policies can include one or more rules, and rules can apply one or more signatures or other matching criteria or heuristics) using rules that specify one or more FQDN address objects (e.g., domain and/or host/server names) are applied as described herein with respect to various embodiments based on the monitored, identified, and decoded network traffic flows.

As also shown, management plane 602 of data appliance 402 includes events 620. In some embodiments, monitored network traffic events are recorded with source and destination IP addresses for the network traffic flow in events data store 620. In some embodiments, the event information is also stored with the FQDN address object(s) (e.g., domain and/or host/server name(s)) and the detected IP address information (e.g., which can also be cached/stored in logs 630 as similarly described above). In some embodiments, when the events are reported (e.g., presented in a user interface display output, log files, reports, and/or charts), the IP addresses are also resolved to a host name if available.

Figure 7:
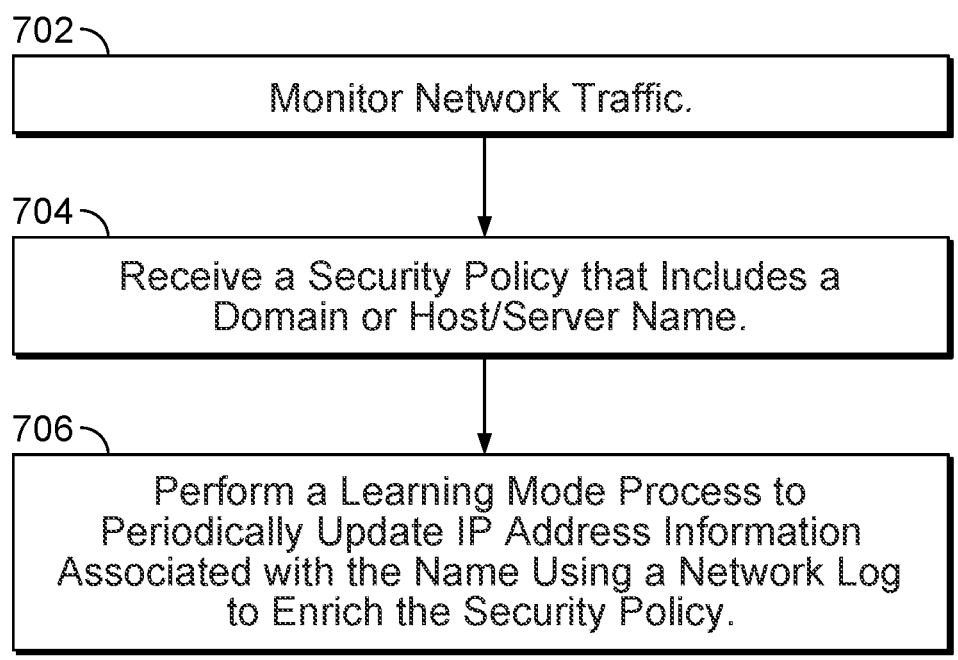
FIG. 7 is a flow diagram for providing a feedback mechanism to enforce a security policy in accordance with some embodiments.

Example Process Embodiments for Providing a Feedback Mechanism to Enforce a Security Policy FIG. 7 is a flow diagram for providing a feedback mechanism to enforce a security policy in accordance with some embodiments. At 702, network traffic is monitored (e.g., using firewall 100). At 704, a security policy that includes a domain (e.g., domain/FQDN) or host/server name is received. At 706, a learning mode process is performed to periodically update Internet Protocol (IP) address information associated with the domain name using a network log to enrich the security policy as similarly described above.

Figure 8:
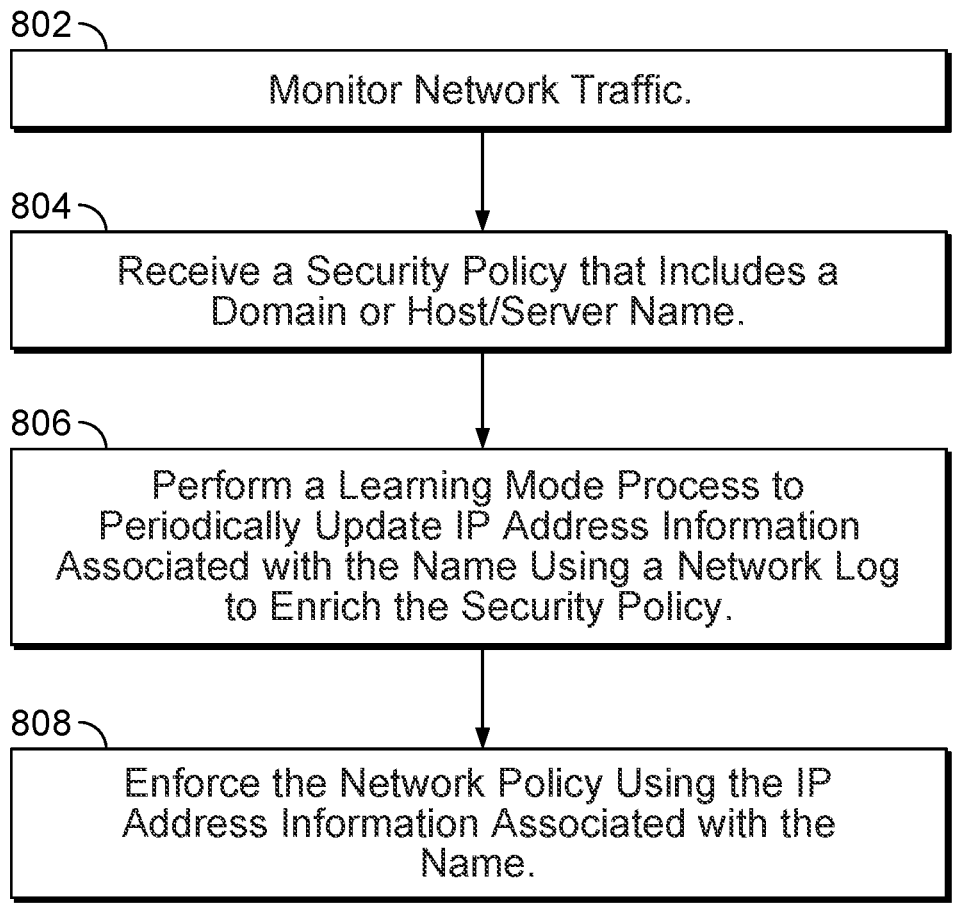
FIG. 8 is another flow diagram for providing a feedback mechanism to enforce a security policy in accordance with some embodiments.

FIG. 8 is another flow diagram for providing a feedback mechanism to enforce a security policy in accordance with some embodiments. At 802, network traffic is monitored (e.g., using firewall 100). At 804, a security policy that includes a domain (e.g., domain/FQDN) or host/server name is received. At 806, a learning mode process is performed to periodically update Internet Protocol (IP) address information associated with the domain name using a network log to enrich the security policy as similarly described above. At 808, the network policy is enforced using the IP address information associated with the name (e.g., domain/FQDN or host/server name).

As will now be apparent, various techniques providing a feedback mechanism to enforce a security policy can be applied using the various embodiments described herein.

Also, various system and network architectures can be applied using the various techniques described herein. For example, the disclosed techniques providing a feedback mechanism to enforce a security policy based on enriched policy definitions can be implemented in an integrated security appliance that provides inline filtering functionality as described herein. As another example, the disclosed techniques providing a feedback mechanism to enforce a security policy based on enriched policy definitions can be implemented using another appliance or computer server, which can communicate to various other security functions (e.g., security appliances, network appliances, and/or host-based security software). As yet another example, the disclosed techniques providing a feedback mechanism to enforce a security policy based on enriched policy definitions can be implemented using or assisted by a security cloud service, which can communicate to various other security functions (e.g., security appliances, network appliances, and/or host-based security software) and/or generate new security updates (e.g., pushes the new signature(s) to various security devices/software that subscribe to signature updates from the security cloud service vendor).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a security policy that includes a domain name at a trusted security device, wherein the security policy is stored on the trusted security device;
perform a learning mode process at an initial deployment of the trusted security device and periodically to update Internet Protocol (IP) address information associated with the domain name based on monitoring of a network log to enrich the security policy, wherein performing the learning mode process comprises extracting a Fully Qualified Domain Name (FQDN) to IP address mapping information from the network log for updating IP address information associated with the domain name; and
enforce the security policy for a new session associated with the domain name based on the updated IP address information associated with the domain name, wherein the trusted security device is configured to block all connection attempts at layer 3 for an unresolved domain name until the security policy is updated to associate the unresolved domain name with updated IP address information determined during the learning mode process; and
a memory coupled to the processor and configured to provide the processor with instructions.

2. The system recited in claim 1, wherein the system includes the trusted security device and wherein the trusted security device includes a firewall.

3. The system recited in claim 1, wherein the IP address information includes Internet Protocol Version 4 (IPv4) information or Internet Protocol Version 6 (IPv6) information, and the domain name includes a Fully Qualified Domain Name (FQDN).

4. The system recited in claim 1, wherein the IP address information is periodically updated based on a Time To Live (TTL) value.

5. The system recited in claim 1, wherein the IP address information is periodically updated based on a configuration setting.

6. The system recited in claim 1, wherein the IP address information is periodically updated based on an event.

7. The system recited in claim 1, wherein the security policy includes a network security rule that is based on the domain name.

8. The system recited in claim 1, wherein the domain name only includes a subset of a Fully Qualified Domain Name (FQDN), and the security policy includes a host name that is not specified as an FQDN.

9. The system recited in claim 1, wherein the processor is further configured to:
enforce the security policy based on the IP address information, wherein the IP address information is associated with the domain name, and the security policy includes a rule or action based on the domain name.

10. The system recited in claim 1, wherein the processor is further configured to:
store the domain name, the IP address information associated with the domain name, and a Time To Live (TTL) value for the IP address information associated with the domain name.

11. The system recited in claim 1, wherein the processor is further configured to:
store the domain name, a plurality of IP addresses associated with the domain name, and a Time To Live (TTL) value for each of the IP addresses associated with the domain name in a data store including one or more tables.

12. The system recited in claim 1, wherein the processor is further configured to:
report events based on network security threats, wherein the reported events include one or more domain names associated with at least one of the network security threats.

13. A method, comprising:
receiving a security policy that includes a domain name at a trusted security device, wherein the security policy is stored on the trusted security device;
performing a learning mode process at an initial deployment of the trusted security device and periodically to update Internet Protocol (IP) address information associated with the domain name based on monitoring of a network log to enrich the security policy, wherein performing the learning mode process comprises extracting a Fully Qualified Domain Name (FQDN) to IP address mapping information from the network log for updating IP address information associated with the domain name; and
enforcing the security policy for a new session associated with the domain name based on the updated IP address information associated with the domain name, wherein the trusted security device is configured to block all connection attempts at layer 3 for an unresolved domain name until the security policy is updated to associate the unresolved domain name with updated IP address information determined during the learning mode process.

14. The method of claim 13, wherein the IP address information includes Internet Protocol Version 4 (IPv4) information or Internet Protocol Version 6 (IPv6) information, and the domain name includes a Fully Qualified Domain Name (FQDN).

15. The method of claim 13, wherein the IP address information is periodically updated based on a Time To Live (TTL) value.

16. The method of claim 13, wherein the IP address information is periodically updated based on a configuration setting.

17. The method of claim 13, wherein the IP address information is periodically updated based on an event.

18. The method of claim 13, wherein the security policy includes a network security rule that is based on the domain name.

19. The method of claim 13, further comprising:
enforcing the security policy based on the IP address information, wherein the IP address information is associated with the domain name, and the security policy includes a rule or action based on the domain name.

20. A computer program product, the computer program product being embodied in a non-transitory computer readable storage medium and comprising computer instructions for:

receiving a security policy that includes a domain name at a trusted security device, wherein the security policy is stored on the trusted security device;

performing a learning mode process at an initial deployment of the trusted security device and periodically to update Internet Protocol (IP) address information associated with the domain name based on monitoring of a network log to enrich the security policy, wherein performing the learning mode process comprises extracting a Fully Qualified Domain Name (FQDN) to IP address mapping information from the network log for updating IP address information associated with the domain name; and enforcing the security policy for a new session associated with the domain name based on the updated IP address information associated with the domain name, wherein the trusted security device is configured to block all connection attempts at layer 3 for an unresolved domain name until the security policy is updated to associate the unresolved domain name with updated IP address information determined during the learning mode process.

\* \* \* \* \*